Sheet 1.
3 Sheets.

A. B. Wilson.

Sewing Machine.

No 414 Reissued Dec. 9, 1856.

A. B. Wilson.

Sewing Machine.

Reissued Dec. 9, 1856.

No 414

A. B. Wilson.

Sewing Machine.

No 414 Reissued Dec. 9, 1856.

UNITED STATES PATENT OFFICE.

A. B. WILSON, OF WATERBURY, CONNECTICUT.

IMPROVEMENT IN SEWING-MACHINES.

Specification forming part of Letters Patent No. 7,776, dated November 12, 1850; Reissue No. 345, dated January 22, 1856; Reissue No. 414, dated December 9, 1856.

*To all whom it may concern:*

Be it known that I, ALLEN B. WILSON, of Waterbury, New Haven county, State of Connecticut, formerly of Pittsfield, Berkshire county, Massachusetts, have invented certain new and useful Improvements in Machinery for Sewing Seams; and I do hereby declare that the following specification, taken in connection with the drawings, is a full, clear, and exact description thereof.

These drawings exhibit my invention as applied to a machine invented by myself, as it is more easy to exemplify by means of a description of an entire machine; but I wish it to be distinctly understood that my improvements and invention as set forth and claimed in this patent are applicable to sewing-machines of various classes, and differing in form and arrangement from each other and from the machine herein described.

Figure 1:
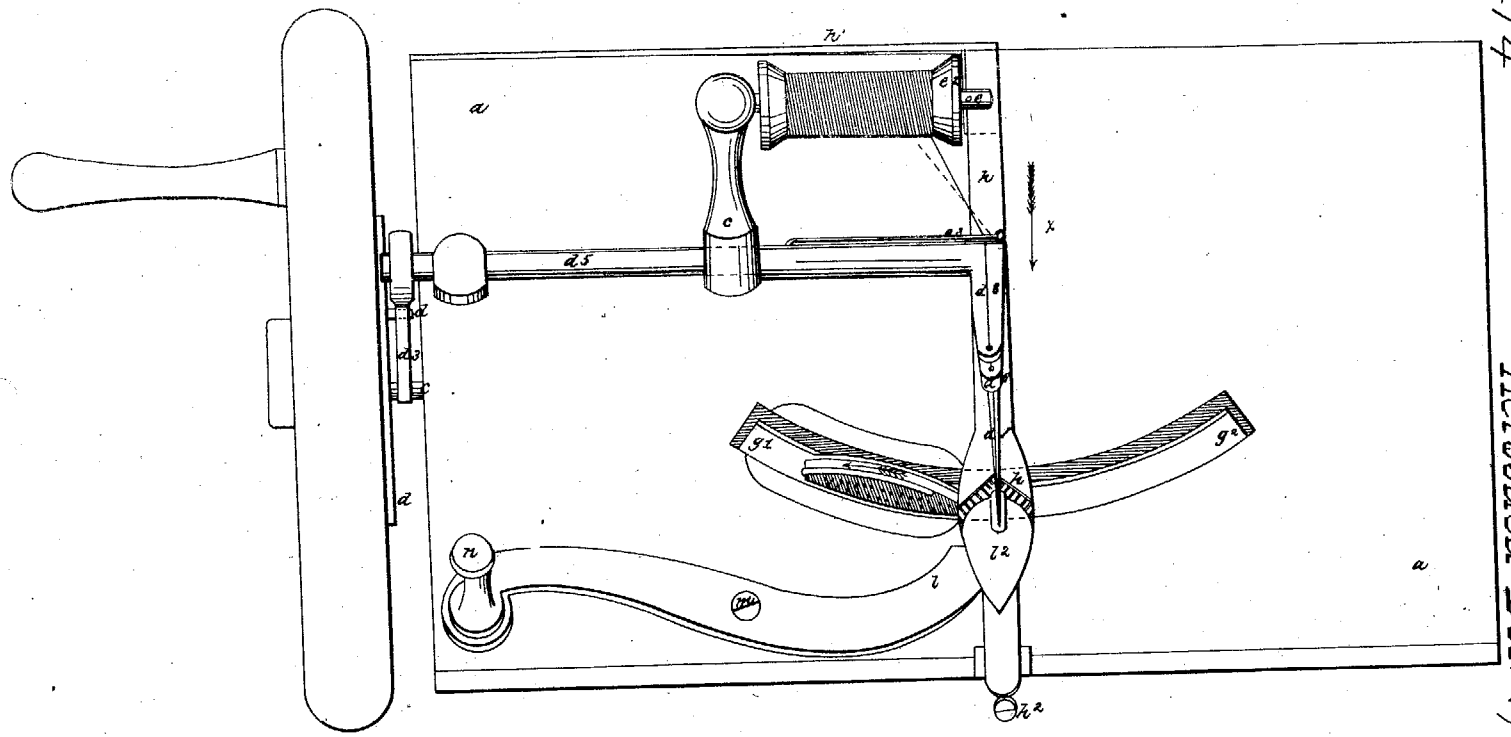
Figure 2:
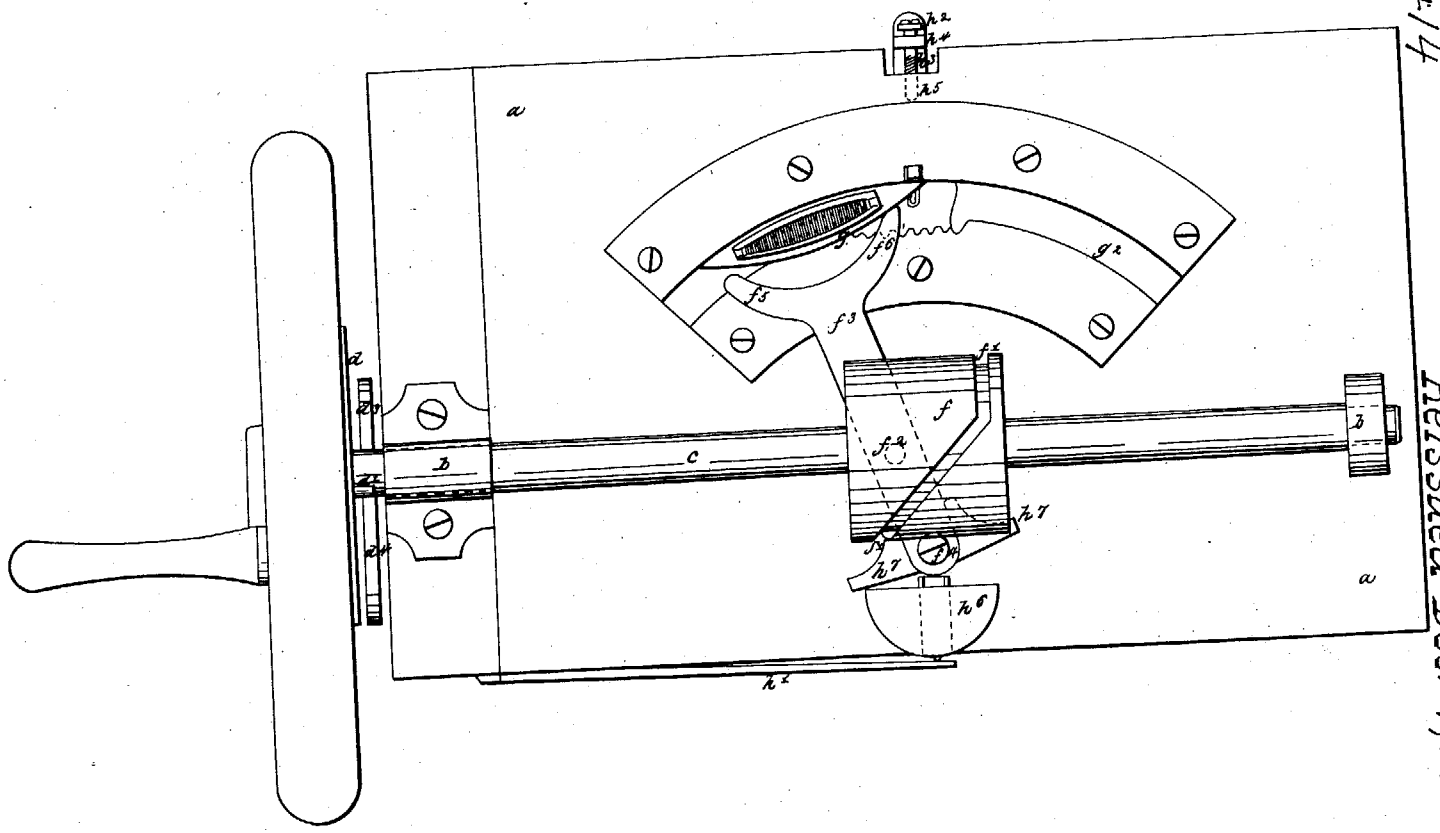
Figure 4:
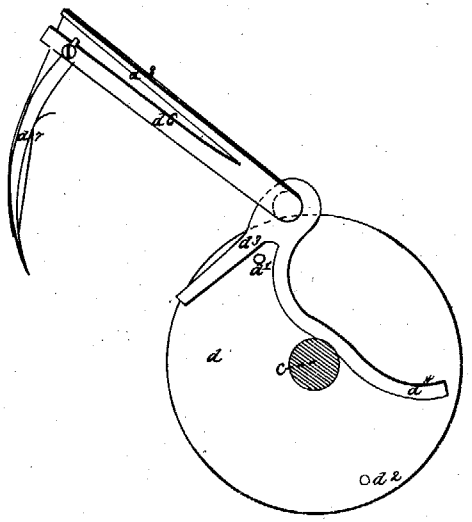
Figure 3:
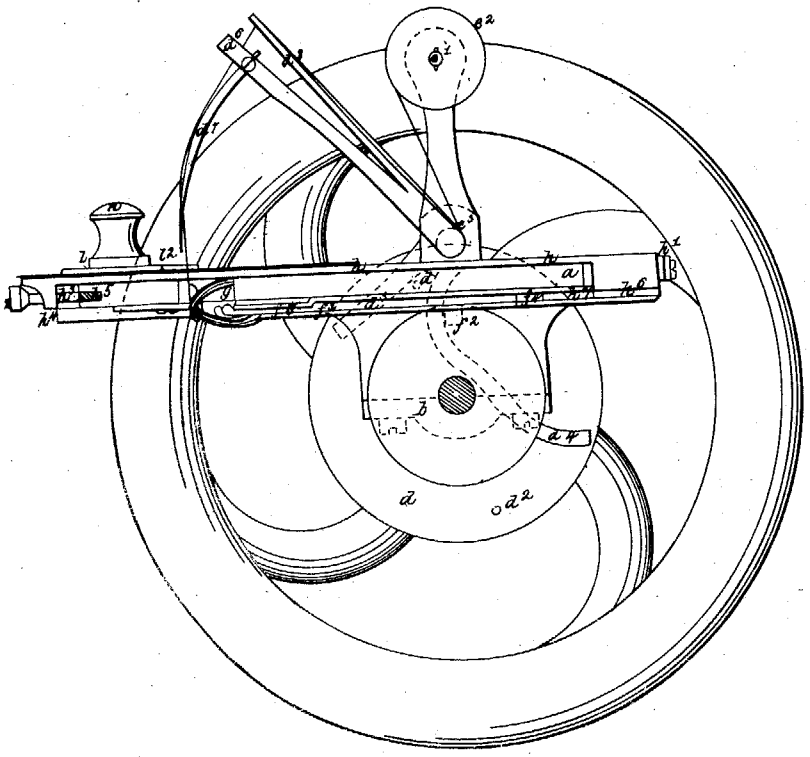

In the drawings, Figure 1 is a perspective view of the machine from the upper side thereof. Fig. 2 is a plan of the bottom of the machine. Fig. 3 is a vertical section through the machine in the plane of the needle-carrier. Fig. 4 is a detailed view of the operative mechanism of the needle.

The same letters refer to the same parts in all the figures.

Previous to the date of my invention numerous sewing-machines had been invented and put in operation having two distinct classes of methods for feeding the material to be sewed, and for supporting it while passing through the machinery. In the first class the article to be sewed was supported upon a horizontal table, and was by the hand of an operator moved at intervals under the needle, no mechanical or automatic feed being provided. In the other class of machinery the material to be seamed was by means of clamps or pins or some equivalent thereof secured to a moving plate, technically called a "baster-plate," which also supported or carried the material, and was by a mechanical connection with other parts of the machine moved along step by step at proper intervals. In some of these machines of later date this baster took the shape of an endless band or chain, thus obviating the necessity of running back the baster-plate after a certain length had been sewed. In the former class of machinery the cloth, being supported by a table, could be turned and twisted at will to sew crooked seams, but the regularity of stitch depended solely upon the skill of the operator. In the latter class the feed was as regular as machinery could make it; but as the cloth or other material was attached to and supported by the baster-plate which carried it, straight seams only, or those of moderate and tolerably regular curvatures, could be sewed.

Now, the object of the first part of my invention is to unite the advantages of these two methods to obtain in one machine the regularity of feed of the latter class and the capacity of sewing irregularly-curved, seams found in the former class.

The nature of the first part of my invention therefore consists in combining a needle and shuttle or their equivalents to make stitches with a table to support the material, and an automatic feed apparatus which will move the cloth without supporting it, and to which the cloth is not attached, the whole substantially in the manner hereinafter set forth, whereby the cloth is fed regularly, so that stitches of uniform length are produced, while the cloth, being supported on a table or platform, and not confined to the feed apparatus by pins or clamps, may be turned and twisted in the feeding mechanism, so as to sew irregularly-curved seams.

Prior to the date of my invention shuttles of sewing-machines were driven by a sort of picker-staff, as in ordinary power-looms, so that the shuttles were fairly thrown through a loop, or else they were caused to travel in their race by means of an arm moving with the shuttle, and connected at two points to it in such wise that one connection was broken before the shuttle entered a loop, while the other remained fast, and the former connection became fast again before the second reached the top, when it in turn was detached until its point of attachment to the shuttle had passed by the thread, this attachment and reattachment being effected by cams and springs. The former method was uncertain, as the shuttle passed the loops at different periods of the action of the needle when the machine was driven at varying velocities. The second method was complex and liable to get out of order, and both were comparatively expensive.

The object of the second part of my invention is to drive sewing-machine shuttles by apparatus which shall follow their motions, or nearly so, as in the second method, while it is even less complex and expensive than the first method noted; and the nature of the second part of my invention consists in driving a sewing-machine shuttle by means of a yoke or pair of jaws coincident with each other in their motion, and nearly coincident with the motion of the shuttle, which is so shaped that a greater or less part of it is embraced by the jaws, being held thereto by the shuttle-race, in which it travels.

In the drawings is represented a shuttle-machine with a bed-plate, *a a*, which serves to hold together all the parts, and at the same time serves as a table or platform for sustaining and supporting the material to be sewed. This platform has attached to it proper journal-boxes *b b*, in which is secured a shaft, *c*, provided at one end with a crank and fly-wheel, and also with a pin-wheel, *d*, and a cam, *f*, the former communicating motion to the needle, the latter to the shuttle and feed-motions.

The wheel *d* has projecting from its face two small pins, $d'$ $d^2$, which act alternately upon two arms, $d^3$ $d^4$, of a species of escapement, and thereby communicate an oscillating motion to the rock-shaft $d^5$, to which these arms are secured. This shaft is mounted in proper journals upon the bed-plate, and carries a needle bar or stalk, $d^6$, upon whose back is fastened a spring, $d^8$, while the needle itself, $d^7$, is attached to the bar in any suitable manner. This needle is curved, is provided with an eye near its point, and is also slightly grooved on its convex side, so as to guide the thread.

Upon the bed-plate is mounted a standard, *e*, supporting an axis, $e'$, upon which is mounted a bobbin, $e^2$, containing thread, whose end is carried under a guide, $e^3$, afterward through a hole in a take-up and let-off spring, $d^8$, then through an aperture on the needle-carrier, and finally through the eye of the needle itself. As the driving-shaft revolves, the needle reciprocates, passing back and forth through the material to be sewed.

The cam *f*, before referred to, has formed on its surface a grooved track or pinway, $f'$, in which rests a pin, $f^2$, projecting from a small lever, $f^3$, pivoted at $f^4$ under the bed-plate of the machine. This track is so formed as to alternately move and stop the lever $f^3$, so that it vibrates in one direction when the needle is in the cloth, then pauses while the needle is out of the cloth, returns in the opposite direction when the needle is again passed through the cloth, and then pauses a second time. Upon the end of this lever are two jaws, $f^5$ $f^6$, which embrace a portion of the shuttle *g*, which is confined by its race $g'$ in such a manner that it cannot recede out of the reach of these jaws. By looking at Fig. 2 it will be seen, also, that the shape and position of the jaws and the curve and pathway of the shuttle are in such relation to each other that only one jaw can touch the shuttle at any one instant of time. The shuttle is pointed at both ends in the present instance, and provided with an ordinary thread-bobbin, and a guide or eye through which the thread passes.

In the action of the machine, while the needle is still in the cloth and a loop of thread partially open, the shuttle approaches this loop with the arm of the jaw farthest from the loop in contact with the shuttle and driving it, while the other jaw is out of contact and permits the shuttle to pass on one side of the loop-thread while the jaw pursues its course on the other. The jaws continue to travel and the shuttle to pass through the loop until the thread reaches the hindermost and driving jaw, when it slips out between that jaw and the shuttle. The stitch is now drawn up, the needle enters the cloth again, the yoke or jaws vibrate a short distance until the jaw that was in contact becomes free and that which was disengaged takes hold, and the same operation as to driving the shuttle and entering and slipping past the loop-thread takes place in the opposite direction. The shuttle-thread is thus zigzagged through the loops of needle-thread, rendering the stitch less liable to unravel; but the shuttle would be moved in precisely the same way in a machine where it always entered the loop from the same side, the difference being that it would pass through a loop only when moving in one direction.

Upon the platform or bed-plate *a* is located a sliding bar, *h*, having a roughened surface on its upper side, near one of its ends. It is pressed in the direction of the arrow *x* by a spring, $h'$, secured to the bed-plate, the length of throw of this spring being limited by the head $h^2$ of a screw, $h^3$, which passes through a projection, $h^4$, on the sliding bar, and may be screwed to a greater or less extent into the bed-plate at $h^5$. To this sliding bar, and below the bed-plate, is fastened a foot or cross, $h^6$, upon whose face act vibrating toes $h^7$ $h^7$, forming part of the lever $f^3$. As this lever vibrates, its toes, acting upon the foot alternately, will move the sliding bar in a direction opposite to that of arrow *x*, and the spring $h'$ will return the bar in the opposite direction as soon as the toes permit. This sliding bar will therefore reciprocate to and fro once during each stroke of the needle, the extent of its motion being governed by the set-screw $h^3$. Upon this sliding or reciprocating surface the cloth or material to be sewed is laid, and it is clear would, if this were the whole of the contrivance, be but slightly affected by its vibrations. In order, therefore, to move the cloth, there is applied to the surface before described another surface, $l^2$, mounted upon a spring-lever, *l*, pivoted at *m*, and provided with a handle, *n*, the whole constituting a species of clamp-jaw, by which the cloth or material to be sewed is, during the action of the machine, held upon the roughened surface before described. The surface $l^2$ is mounted upon a spring, in order that the surfaces may grasp between them different thicknesses of material, and also in order that the roughened surface may more readily move in one direction without moving the cloth.

In the operation of the machine the cloth or material to be sewed is laid upon the platform or supporting-table and bed-plate *a*, with a portion of it lying over the lower roughened feeding-clamp, and is held at rest by its friction on the table or platform and by the needle which rests in the cloth, while the lower surface moves in the direction of arrow *x;* but when the needle has risen free from the cloth, the lower surface moves in the opposite direction and draws with it the cloth, which is held in firm contact with its roughened end by means of the comparatively smooth upper surface. In order to make this operation certain, the lower surface should be roughened by small teeth, like saw-teeth, which, when moved in one direction, slip under without moving the cloth, but when moved in the other direction catch the material on their points and force it to travel with them.

Now, it will be perceived that the stitches formed will be of regular length under any given adjustment of the machine, as that regularity depends upon mechanical accuracy of construction, and also that the cloth or material to be sewed, being held up and supported by a tackle, can be twisted and turned thereon to sew curved seams, as it is not attached to or supported by the feeding apparatus, as was the case in the former machines, but is merely grasped in a small portion of its surface by the feeding clamps or jaws. It also is evident that my method of driving a shuttle is simple, inexpensive, not liable to derangement, and, moreover, is superior to any picker-staff arrangement, as the motion of the shuttle will properly coincide with that of the needle under varying velocities of the machine.

The form or precise construction of my supporting-table is unimportant, so long as it supports cloth in such manner that it may be stitched by the joint action of a needle and shuttle, or their equivalents, and at the same time presents the cloth properly to the action of the feeding-surfaces and permits of such a turning or twisting of the material to be sewed as may be practically necessary without disturbing the action of the feeding-surfaces or clamp, and the feed apparatus, making part of the combination which I claim as my invention, may be variously modified without losing its character as an equivalent of the precise mechanism herein described, so long as it feeds the material regularly, and does not require the cloth to be attached to it by pins or their equivalents, while it at the same time permits the cloth to be turned and twisted irrespective of the line of motion of the feeding mechanism. The precise shape of my shuttle and its containing yoke or jaws is also immaterial, so long as the latter alternately, during the action of the machine, come in contact with and drive the former, permitting the shuttle-points freely to enter a loop of thread, and allowing that thread to slip out, practically unimpeded, between the driving-jaw and the shuttle itself, and so long as these jaws have a motion nearly coincident with each other and with the shuttle which they drive, both in the extent of their travel and in the periods at which they commence to move or pause or return again, the distinction in mechanical effect between my jaws and the old picker-staffs being that the former push the shuttle along, following it up in its passage, while the latter strike it a blow and throw it without following the shuttle throughout the extent of its path. The former in their action travel, passing by and beyond the loop or the place where it is formed, and then returning again past that spot, while the latter complete their whole motion on one side of the loop only, and never pass the loop or the place where it is formed. Each picker-staff vibrates nearly up to the loop, and then stops and returns.

The precise position of the shuttle in reference to the loop at any period of the action of the machine is in my machine dependent upon the mechanical construction of the parts of the machine, and is not effected practically by the velocity at which the machine is driven; but when picker-staffs are used and the shuttle is thrown by a blow whose force depends not only upon the distance through which the staff travels, but also upon its velocity, then the precise time at which a shuttle shall enter a loop or leave it varies not only with the velocity of the machine, but also with the varying weights of the shuttle, as it happens to contain a greater or less weight of thread. Such a want of precision in the motion of the shuttle is found to be injurious in machinery so nice in its operation and delicate in construction as a sewing-machine.

The method of passing the shuttle through the loops first from the right and then from the left has a tendency to set the two threads in such relation to each other in the finished stitch that it is less liable to rip than when the shuttle enters from one side only, as is usual. It also diminishes the number of motions required for the promotion of a single stitch, and the double-pointed shuttle is a necessary adjunct in a machine where the shuttle-thread is thus passed through the needle-thread.

It is hardly necessary to state that the different features of my invention may be used separately from each other with good effect in connection with sewing-machines differing in construction and operation from that herein described.

Having thus described my improvements, I claim as of my own invention:

1. The combination, in a single machine, of these three following elements, namely: a table or platform to support the material to be sewed, holding it for the action of the needle, and presenting it properly to the grasp of the feeding apparatus; a sewing mechanism proper, consisting of a needle and shuttle, or their equivalents, and a mechanical feed automatic, and causing the cloth to progress regularly, to which the cloth is not attached, and so grasping the cloth that it may be turned and twisted by the hand of an operator, such twisting not interfering with the regular progression of the cloth, and the whole being constructed and acting together and in combination with each other substantially in the manner and for the purposes herein specified.

2. Moving a shuttle so shaped and held by its race that jaws may embrace it by means of two jaws which are alternately in contact with the shuttle, and are constructed and move substantially in the manner herein set forth, making and breaking their contact without any aid from cams or springs, or the equivalents of such devices.

3. A double-pointed shuttle, substantially such as is herein specified, in combination with jaws for driving it, substantially such as are described, whereby the shuttle may be thrown alternately from opposite directions through loops without practically disturbing the loop-thread.

In testimony whereof I have hereunto subscribed my name, at the city of New York, on the 17th day of September, A. D. 1856.

ALLEN B. WILSON.

In presence of—
ALLAN MELVILLE,
M. B. ANAM.